United States Patent
Yamanaka (10) Patent No.: US 8,045,191 B2
(45) Date of Patent: Oct. 25, 2011

(54) INFORMATION PROCESSING DEVICE WITH ATTACHED SECURITY SETTINGS AND SECURITY SETTING-DEPENDENT OPERATION MODES

(75) Inventor: Toshihiro Yamanaka, Ikoma (JP)

(73) Assignee: Sharp Kabushiki Kaisha, Osaka (JP)

( * ) Notice: Subject to any disclaimer, the term of this patent is extended or adjusted under 35 U.S.C. 154(b) by 1071 days.

(21) Appl. No.: 10/549,855

(22) PCT Filed: Apr. 8, 2004

(86) PCT No.: PCT/JP2004/005101
§ 371 (c)(1),
(2), (4) Date: Sep. 23, 2005

(87) PCT Pub. No.: WO2004/097651
PCT Pub. Date: Nov. 11, 2004

(65) Prior Publication Data
US 2006/0192988 A1    Aug. 31, 2006

(30) Foreign Application Priority Data
Apr. 28, 2003   (JP) ................. 2003-124251

(51) Int. Cl.
*G06F 3/12* (2006.01)
(52) U.S. Cl. ........... 358/1.14; 358/1.15; 358/1.16; 726/32; 399/88; 399/75
(58) Field of Classification Search ........ 358/1.14, 358/1.15, 1.16; 726/32; 399/88, 75
See application file for complete search history.

(56) References Cited

U.S. PATENT DOCUMENTS
5,884,122 A * 3/1999 Kawabuchi et al. ............ 399/88
7,072,054 B2 * 7/2006 Bunker .......................... 358/1.14
2004/0012812 A1 * 1/2004 Shimizu ......................... 358/1.15

FOREIGN PATENT DOCUMENTS
JP    60-25385    2/1985
JP    61-216012   9/1986
(Continued)

OTHER PUBLICATIONS

International Search Report of PCT/JP2004/005101, mailed Jul. 20, 2004.
Okamoto et al., "Data Security Kit AR-FR4", [online], Sharp Technical Journal No. 16, Whole No. 84, Dec. 2002.
"Security Solution", [online], Sharp Corp., Feb. 2003.

*Primary Examiner* — Benny Tieu
*Assistant Examiner* — Paul F Payer
(74) *Attorney, Agent, or Firm* — Nixon & Vanderhye P.C.

(57) ABSTRACT

In a printer 1 which is an information processing apparatus of the present invention, after a password is accepted from a PC 2 together with image data and job information, the image data is encrypted and stored in a storage part 106, the job information is associated with the password and stored in a management part 104 as a job management table, and the process waits. In a case where a security program is executing, in case that a main power 110 is turned off, the operation of a backup part 105 to supply power to the management part 104 is inhibited, so that the job information table stored in the management part 104 is deleted. In a case where the security program is not executing, power is supplied to the management part 104 by the backup part, thereby maintaining the job management table stored in the management part 104.

13 Claims, 4 Drawing Sheets

FOREIGN PATENT DOCUMENTS

| | | |
|---|---|---|
| JP | 62-239251 A | 10/1987 |
| JP | 4-199246 A | 7/1992 |
| JP | 4-107062 | 9/1992 |
| JP | 5-334168 | 12/1993 |
| JP | 8-234936 | 9/1996 |
| JP | 9-284572 | 10/1997 |
| JP | 11-143658 | 5/1999 |
| JP | 2000-047946 | 2/2000 |
| JP | 2002-185659 | 6/2002 |
| JP | 2003-150360 | 5/2003 |

\* cited by examiner

| MANAGE-MENT No. | PROCESS-ING No. | STORAGE AREA | DATE OF ACCEPTANCE | REQUES-TER | SIZE | NUMBER OF SHEETS | NUMBER OF COPIES | MODE |
|---|---|---|---|---|---|---|---|---|
| 3 | 1 | g~k | 02/10/24 17:05 | PC002 | A4 | 5 | 1 | NORMAL |
| 4 | 2 | l~u | 02/10/24 17:06 | PC003 | A4 | 15 | 5 | NORMAL |
| 5 | 3 | v~w | 02/10/24 17:06 | PC006 | A4 | 2 | 1 | NORMAL |
| 1 | 4 | a~b | 02/10/24 17:01 | PC001 | B4 | 1 | 1 | CONFIDEN-TIALxxxx |
| 2 | 5 | c~f | 02/10/24 17:02 | PC001 | B4 | 2 | 1 | CONFIDEN-TIALxxxx |

FIG. 4

INFORMATION PROCESSING DEVICE WITH ATTACHED SECURITY SETTINGS AND SECURITY SETTING-DEPENDENT OPERATION MODES

This application is the national phase under 35 U.S.C. §371 of PCT International Application No. PCT/JP2004/005101 which has an International filing date of Apr. 8, 2004 and designated the United States of America.

TECHNICAL FIELD

The technical field of the present disclosure relates to an information processing apparatus that is provided with means for storing information to be processed and is capable of operating means for invalidating the information.

BACKGROUND ART

Many printers in recent years are connected to a communication network and provided with a network printer function to receive image data from another apparatus such as a personal computer (PC) connected to the communication network and output an image. Further, multi-function apparatuses have been commercialized in which printers are provided with a plurality of functions such as a copying function to capture an image recorded on a sheet as image data by scanning it, form an image based on the captured image data and output the image, a facsimile function to transmit and receive image data to and from an external facsimile by use of facsimile communication, and a transmission function to transmit the captured image data to an external apparatus. In order to perform the image data processing in each function without stagnation, printers having such advanced multifunction are provided with storing means such as a hard disk for storing information such as image data and have a parallel processing function to successively store the accepted information while successively processing the information already stored in the storage image.

To the printers as described above, many PCs can be connected through the communication network, so that a plurality of users can provide an image output instruction. For this reason, there is a possibility that the images outputted onto recording sheets on instructions from a plurality of users are mixed together in the image discharge part and carried away by a wrong user by mistake. Therefore, a technology has been developed such that when receiving an image output job transmitted from a PC, the printer stores the job and waits without performing the image output and after the user inputs an output instruction by directly operating the printer, the printer outputs the image. Japanese Patent Application Laid-Open No. 60-25385 discloses a technology such that a password is transmitted together with image data from a PC to the printer, the printer stores the image data and waits, and in case that the user inputs the correct password by directly operating the printer, the printer outputs the image. Moreover, among such printers, products have been developed that have a function to back up information associated with the processing on standby in order that even when the power is turned off while the processing is on standby, the image output can be performed after the power is turned on again.

There are cases where information handled by printers includes confidential information such as documents including trade secrets, and security measures are necessary for the information stored in the storing means by the printer. In particular, in the case of a printer in which the image data is stored until the correct password is inputted as disclosed in Japanese Patent Application Laid-Open No. 60-25385, in case that the function to back up the information associated with the processing on standby is provided, the information is not deleted but is stored even after the power is turned off. For this reason, information such as image data can be taken out to the outside, for example, by reading out the information from an external apparatus or detaching the storing means, so that it is difficult to maintain the confidentiality of the information being handled.

SUMMARY

It is desirable to provide an information processing apparatus capable of maintaining the confidentiality of the information to be processed, by limiting the function to back up the stored information.

An illustrative information processing apparatus includes storing means for storing unprocessed information; and resuming means for resuming, in case that information processing is temporarily stopped and resumed, the information processing under a condition where the unprocessed information is stored in the storing means, invalidating means for invalidating information; means for making the invalidating means operable so that after the information is processed, the invalidating means invalidates the processed information; and limiting means for limiting, in case that the invalidating means is operable, the operation of the resuming means and resuming the information processing under a condition where part or all of the unprocessed information is deleted from the storing means.

An illustrative non-limiting information processing apparatus includes storing means for storing unprocessed information; and resuming means for resuming, in case that information processing is temporarily stopped and resumed, the information processing under a condition where the unprocessed information is stored in the storing means, means for additionally making operable invalidating means for invalidating, after information is processed, the processed information; and limiting means for limiting, in case that the invalidating means is operable, the operation of the resuming means and resuming the information processing under a condition where part or all of the unprocessed information is deleted from the storing means.

An illustrative non-limiting embodiment of the resuming means includes means for maintaining a condition where the storing means stores the unprocessed information while the information processing is stopped.

In a non-limiting illustrative example, the unprocessed information comprises data to be processed and associated information associated with the data. Also, a non-limiting illustrative embodiment of the storing means includes first storing means for storing the data to be processed; and second storing means for storing the associated information including information necessary for reading out the data to be processed from the first storing means, and an illustrative non-limiting embodiment of the limiting means can be structured so as to resume the information processing under a condition where the associated information is deleted from the second storing means.

An illustrative non-limiting embodiment of the second storing means can be structured so as to store the data to be processed, in a condition of being encrypted.

According to a non-limiting illustrative aspect of the disclosure, in an information processing apparatus provided with: storing means for storing unprocessed information; and resuming means for resuming, in case that the apparatus is turned off and resumed such as in case that the power is shut off and turned on again, the information processing under a condition where the unprocessed information is stored in the storing means, in case that invalidating means for invalidating the processed information is operable, the operation of the resuming means is limited, part or all of the unprocessed information is deleted and the information processing is resumed. The invalidating means is made operable by switching between operating state and non-operating state by setting or is made operable by being additionally provided. By resuming the processing under a condition where part or all of the unprocessed information is deleted, the information associated with the processing is prevented from continuing being stored in a condition where it can be taken out to the outside, thereby maintaining the confidentiality of the information to be processed.

An illustrative non-limiting embodiment of the resuming means can maintain the unprocessed information so as not to be lost even while the power is shut off, for example, by using a backup power source. The information that the process waits to perform can be processed even after the restart, so that convenience is maintained.

In a non-limiting illustrative aspect, data to be processed such as image data, and associated information including information necessary for reading out data such as an address where the data is stored are stored in the storing means, and in case that the invalidating means is operating, the processing is resumed under a condition where the associated information is deleted. The associated information is lost after the restart, so that it is difficult to read out the data. This prevents the information associated with the processing from continuing being stored in a condition where it can be taken out to the outside, thereby maintaining the confidentiality of the information to be processed.

In another non-limiting illustrative aspect, by storing the data to be processed in a condition of being encrypted, it is made difficult to take out data such as image data to the outside for use in case that the invalidating means is not operating and it is facilitated to maintain the confidentiality of the information.

DETAILED DESCRIPTION

Figure 1:
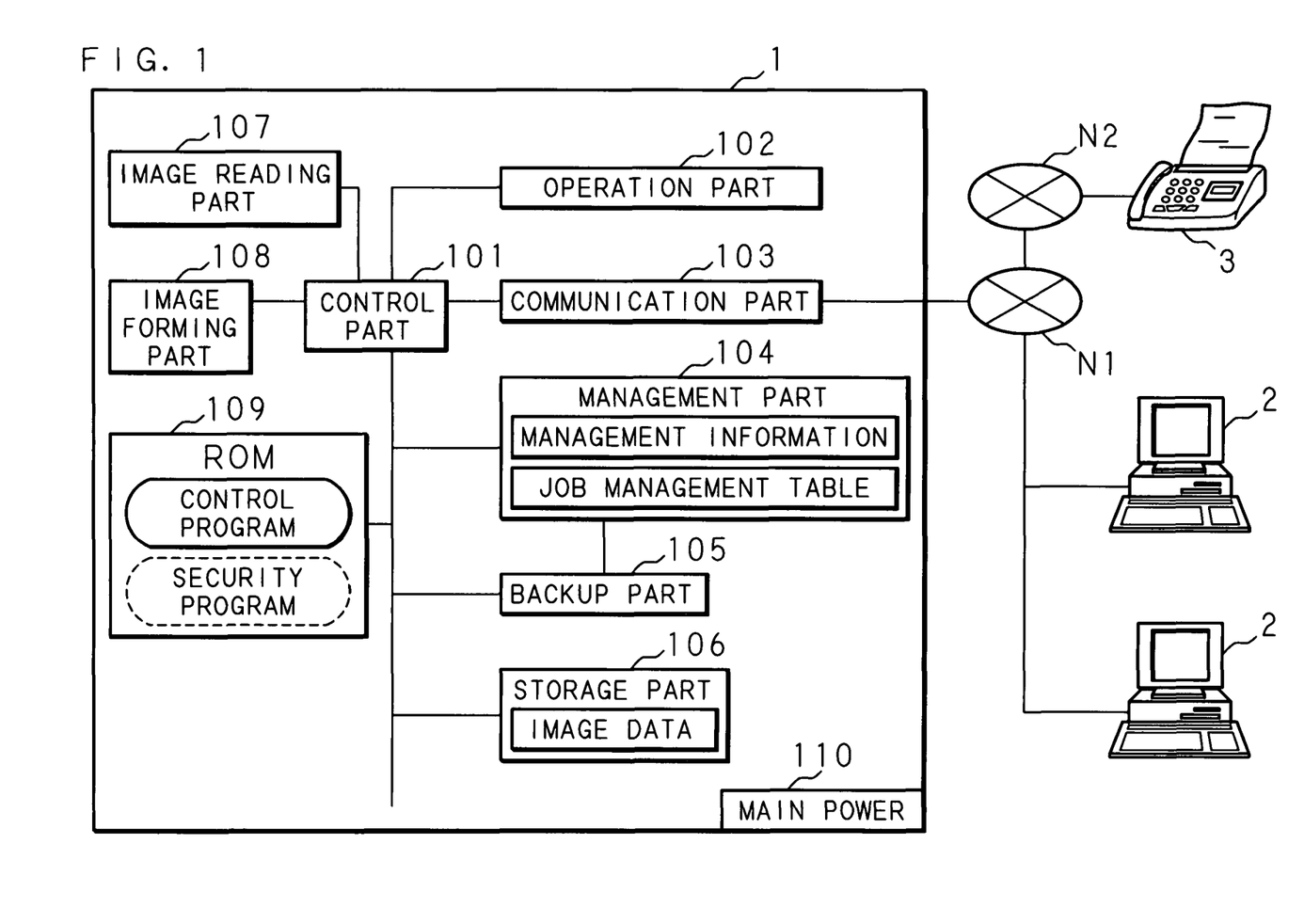
FIG. 1 is a block diagram showing an internal structure of an illustrative non-limiting embodiment of a printer as an example information processing apparatus.

FIG. 1 is a block diagram showing the internal structure of a non-limiting illustrative embodiment of a printer as an example information processing. The printer 1 is provided with a control part 101 comprising a CPU that performs computations and a RAM that stores temporary information involved in the computations. To the control part 101, a ROM 109 is connected that stores a control program for controlling the printer 1, and the control part 101 controls the entire printer 1 in accordance with the control program stored in the ROM 109. Moreover, to the control part 101, a management part 104 is connected that is a memory storing management information for managing the processing performed by the printer 1, and the control part 101 refers to the management information stored in the management part 104 and controls the printer 1 based the information being referred to. Moreover, to the control part 101, the following are connected: an image reading part 107 that reads an image recorded on a sheet by scanning it and generates electronic image data based on the image being read out; and an image forming part 108 that forms an image from the image data, records the formed image onto a recording sheet and outputs the image, and the printer 1 functions as a copier that copies the image read out by the image reading part 107. Moreover, to the control part 101, a storage part 106 is connected that comprises a hard disk or a nonvolatile memory. The storage part 106 is the first storing means according to the present invention, and the management part 104 is the second storing means according to the present invention. The storage part 106 stores the image data representative of the contents of the outputted image which is the data to be processed, and the management part 104 stores a job management table in which job information associated with the image data such as the number of copies of the outputted image is summarized. Moreover, to the control part 101, an operation part 102 is connected that accepts operations from the user, and the operation part 102 can include display means such as a liquid crystal panel for displaying information necessary for the operations; and input means such as a touch panel or a numeric keypad to which information such as a control instruction is inputted by the user's operation.

Further, to the control part 101, a communication part 103 is connected that is connected to an external communication network N1 such as a LAN, and the communication part 103 exchanges information with the outside through the communication network N1. A plurality of PCs 2 are connected to the communication network N1, the communication part 103 receives the image data transmitted from the PC 2 through the communication network N1, and the image forming part 108 is capable of forming an image from the image data received by the communication part 103 and outputting the image, whereby the printer 1 functions as a network printer. Moreover, the printer 1 is capable of transmitting the image data generated by the image reading part 107 reading an image, from the communication part 103 to the PC 2 through the communication network N1, thereby functioning as a network scanner. Moreover, the communication part 103, which is capable of facsimile communication, is capable of transmitting the image data generated by the image reading part 107 reading an image, to another facsimile 3 connected to a public network N2 connected to the communication network N1 by facsimile communication through the public network N2. Moreover, the image data transmitted from the facsimile 3 by facsimile communication is received through the public network N2, and the image forming part 108 is capable of forming an image from the image data received by the communication part 103 and outputting the image.

Moreover, the printer 1 is provided with a main power 110, and the main power 110 receives power from the external commercial power and supplies power to the entire printer 1. Further, the printer 1 is provided with a backup part 105 which is an auxiliary power other than the main power 110, and the backup part 105 which is connected to the management part 104 supplies power to the management part 104 for a predetermined time by use of the external commercial power source or an internal power source in case that the main power 110 is turned off, so that when the power supply from the main power 110 is resumed in the predetermined period, the processing can be resumed under a condition where the information stored in the management part 104 is maintained.

Figure 2:
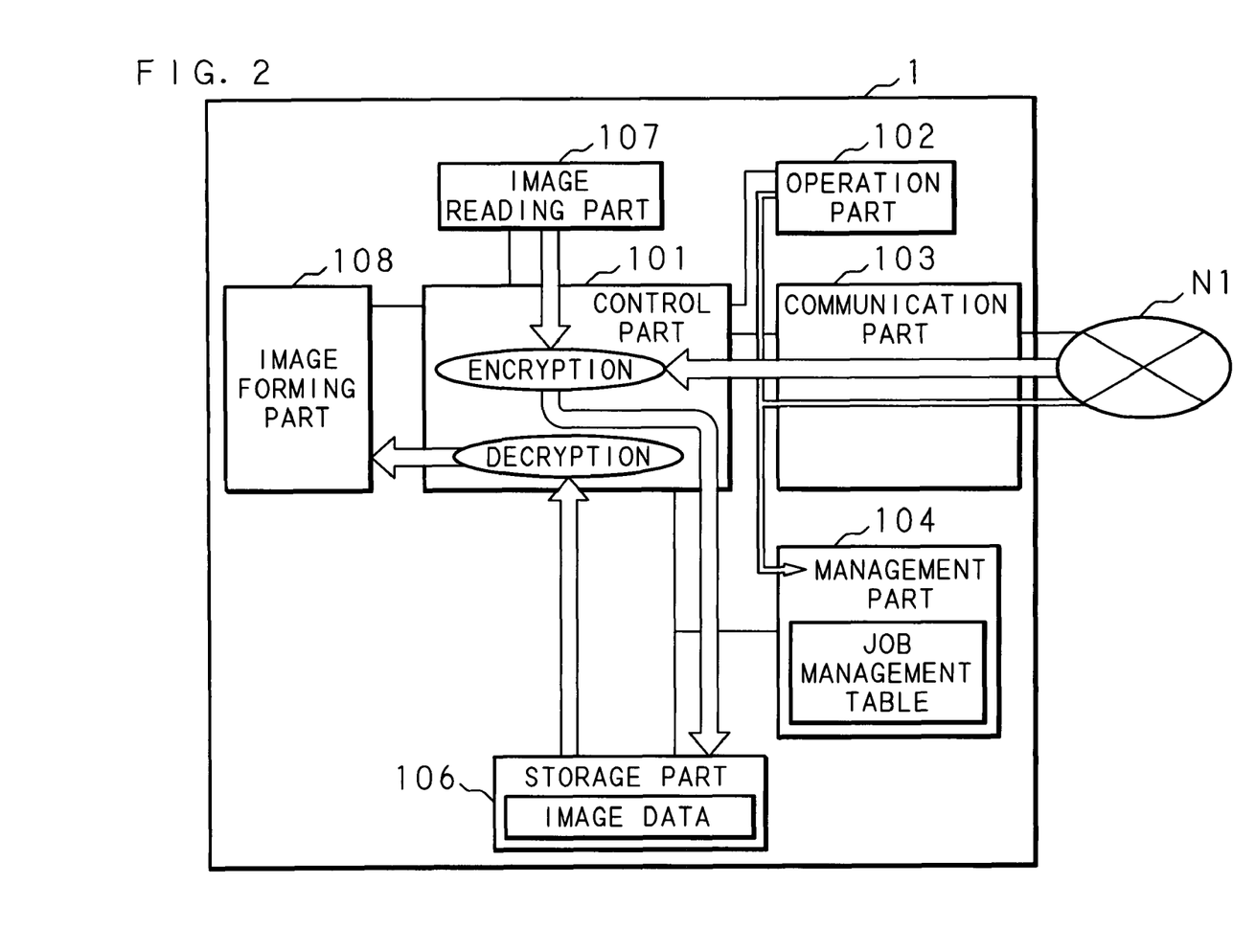
FIG. 2 is a schematic view showing an illustrative non-limiting processing performed by the printer in case that an image is outputted.

FIG. 2 is a schematic view showing the non-limiting illustrative processing performed by the printer 1 when an image is outputted. In case that outputting an image on an instruction from the external PC 2, the printer 1 receives image data and job information from the PC 2 by the communication part 103 through the communication network N1. In the figure, flows of the image data are indicated by thick arrows, and flows of the job information are indicated by thin arrows. Moreover, the image read by the image reading part 107 is outputted, the image data is accepted from the image reading part 107, and the job information is accepted from the operation part 102. The control part 101 stores the accepted job information in the management part 104 in a job management table in which the job information is summarized by being assigned a management number in the order of acceptance. Moreover, the control part 101 encrypts the accepted image data in accordance with the control program stored in the ROM 109, stores the encrypted image data into the storage part 106, and information on the storage area representative of where in the storage part 106 the image data is stored is added to the job management table.

Figure 3:
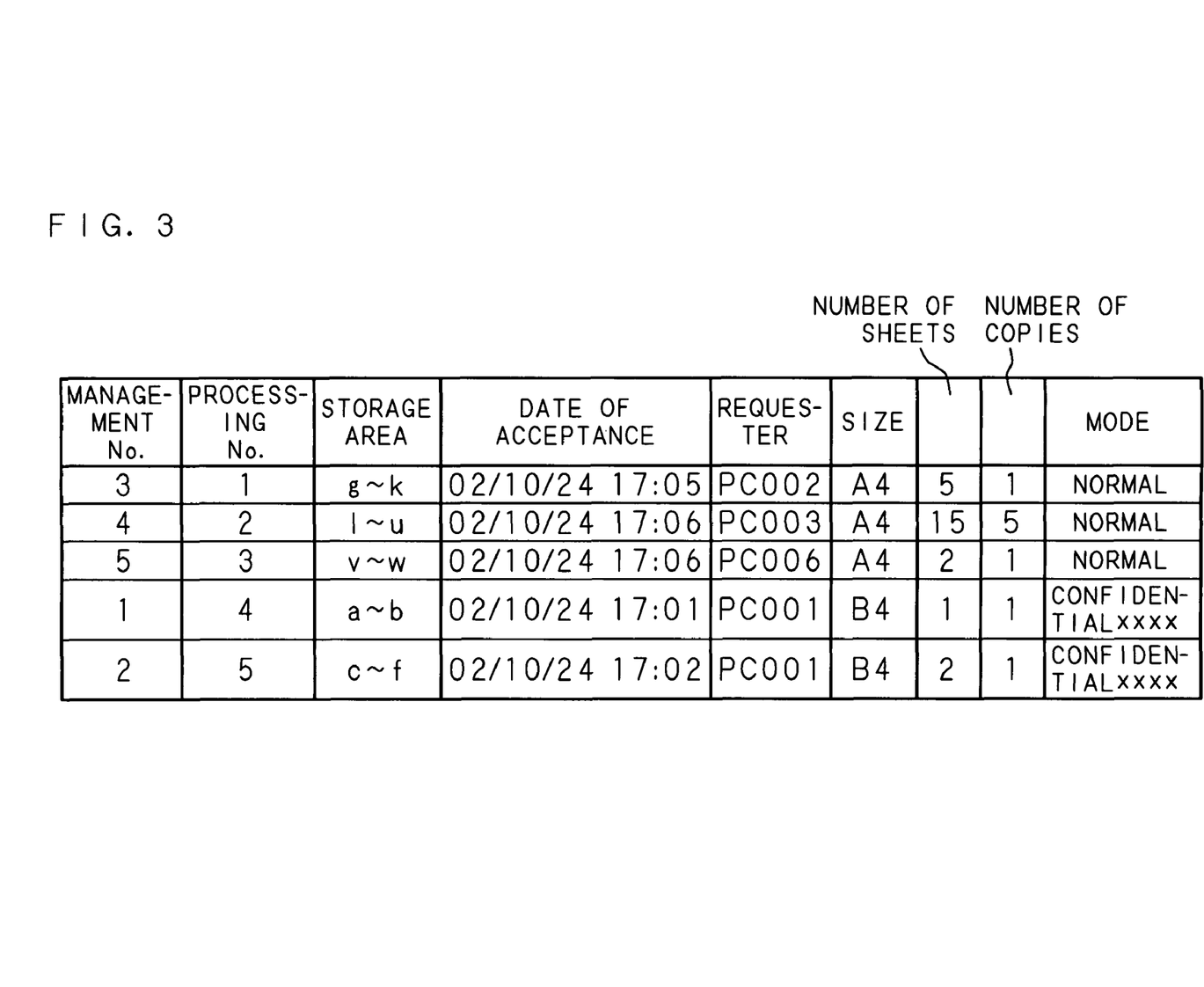
FIG. 3 is a conceptual diagram showing an illustrative no-limiting example of the contents of a job management table stored in a management part.

FIG. 3 is a conceptual diagram showing an illustrative non-limiting example of the contents of the job management table stored in the management part 104. The job information accepted by the printer 1 includes information such as the date of acceptance, the requester representative of the PC 2 which is the transmitter of the job information, the image size, the number of sheets of the image in case that the image is outputted onto recording sheets and the number of copies, and is recorded in a condition of being assigned a management number in the order of acceptance. Moreover, the storage area of the image data associated with each job information is recorded, so that the image data to be outputted as an image can be referred to. Further, for each job information, a normal mode or a confidential mode is set as an image output mode. The confidential mode is a mode in which the job information including a password is transmitted from the PC 2 and in case that the same password is accepted by the operation part 102, the image is outputted, and the password received from the PC 2 is recorded. In case that storing the job management table into the management part 104, the control part 101 assigns a processing number to the job information while giving higher priority to the job information for which the normal mode is set.

The control part 101 selects, in accordance with the control program stored in the ROM 109, the job information in the order of the processing numbers with reference to the jog management table stored in the management part 104, reads out the encrypted image data stored in the storage area of the storage part 106 represented by the selected job information, decrypts the image data being read out, forms an image by the image forming part 108 from the decrypted image data, and outputs the image in accordance with the contents of the job information. The control part 101 deletes, in accordance with the control program stored in the ROM 109, the job information for which the processing is finished, from the job management table stored in the management part 104, and selects the next job information. For the job information for which the confidential mode is set, the process waits until an output instruction from the user is accepted by the operation part 102, and in case that the output instruction is accepted, in accordance with the control program stored in the ROM 109, the control part 101 outputs a password input request onto the display means of the operation part 102, and performs the image output processing associated with the job information in case that a password coinciding with the password recorded on the job information associated with the output instruction is accepted by the operation part 102. The job information for which the confidential mode is set continues being recorded in the job management table until a correct password is accepted by the operation part 102 and the processing is performed.

Various functions of the printer 1 as described above are controlled by the control part 101 in accordance with the control program stored in the ROM 109, and in the printer 1, the control part 101 is capable of performing control in accordance with a security program for improving security in addition to the control program. By replacing the ROM not storing the security program with a ROM 109 storing the security program or by accepting by the operation part 102 an instruction to execute the security program stored in the ROM 109, the control part 101 can control the printer 1 in accordance with the security program stored in the ROM 109. The control part 101 can operate as the invalidating means by following the security program stored in the ROM 109, and deletes the image data stored in the storage part 106 or performs a processing such as overwriting the image data with predetermined information to thereby invalidate the already-processed image data stored in the storage part 106 so as to be unusable. Moreover, since there are cases where even if the image data is deleted, the image data can be restored because of the magnetism remaining in the storage part 106, setting can be made so that the image data is deleted a plurality of times, for example, by overwriting it with random data.

In case that the security program is not executing, management information representing that the printer 1 is not in a condition where the security program executes is stored in the management part 104. Moreover, in case that the ROM 109 storing the security program is provided or in case that an instruction to execute the security program stored in the ROM 109 is accepted by the operation part 102, the control part 101 stores, into the management part 104, management information representing that the printer 1 is in a condition where the security program executes. In the image output processing, the control part 101 checks the management information stored in the management part 104, and determines whether or not the contents of the management information represent that the printer 1 is in a condition where the security program executes. In case that the printer 1 is in a condition where the security program executes, the control part 101 invalidates the image data for which the image output is finished, thereby ensuring the security of the information.

Further, in case that controlling the printer 1 in accordance with the security program, the control part 101 inhibits the backup part 105 from supplying power to the management part 104 in accordance with the control program, and restarts the printer 1 under a condition where the job management table is deleted from the management part 104.

Figure 4:
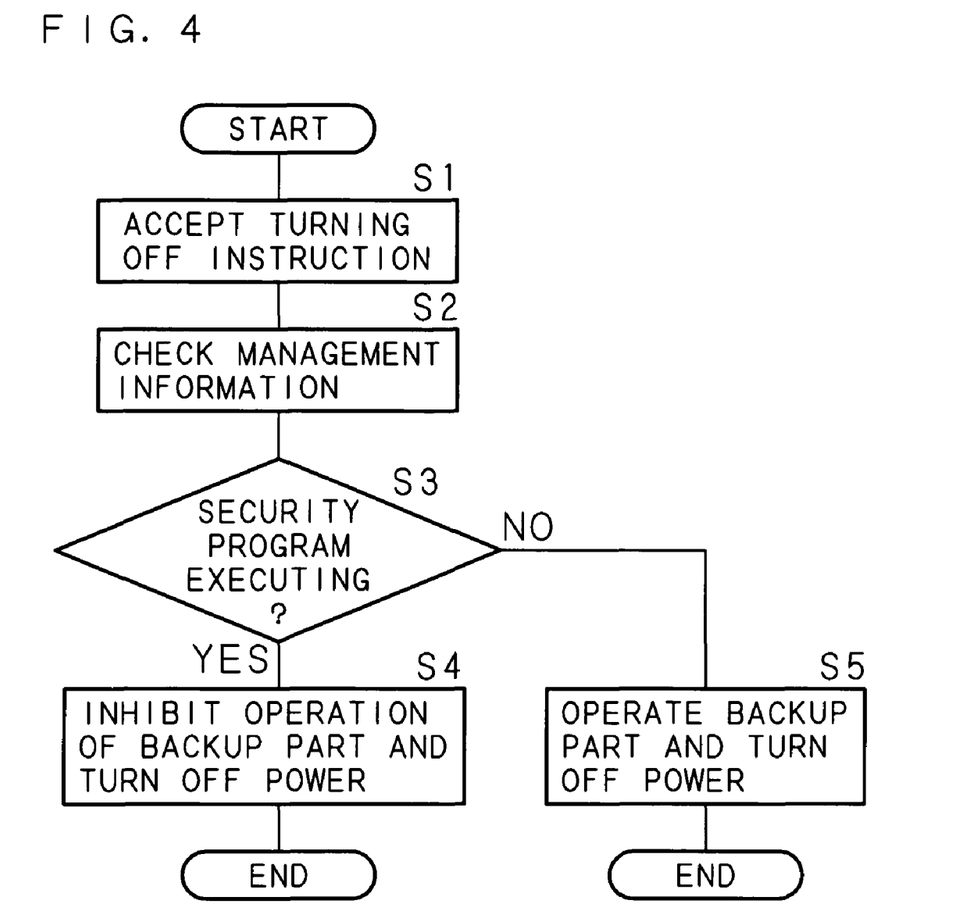
FIG. 4 is a flowchart showing illustrative non-limiting procedures of the operation for the printer to turn off the main power.

FIG. 4 is a flowchart showing illustrative non-limiting procedures of the operation for the printer 1 to turn off the main power 110. In the printer 1, an instruction for turning off the main power 110 is accepted by the operation part 102 (S1), and the control part 101 checks the management information stored in the management part 104 in accordance with the control program and the security program stored in the ROM 109 (S2) and determines whether or not the contents of the management information represent that the printer 1 is in a condition where the security program executes (S3). In case that the contents of the management information represent that the printer 1 is in a condition where the security program executes (S3: YES), the control part 101 inhibits the operation of the backup part 105 and turns off the main power 110 in accordance with the control program and the security program stored in the ROM 109 (S4). In this case, since no power is supplied from the backup part 105 to the management part 104 and the main power 110 is turned off, the job management table stored in the management part 104 which is a memory is deleted. In case that the main power 110 is turned on again, since the job management table including the information on the storage area of the image data stored in the storage part 106 is deleted, the access to the image data is difficult. In case that the contents of the management information do not represent that the printer 1 is in a condition where the security program executes at step S3 (S3: NO), the control part 101 operates the backup part 105 and turns off the main power 110 in accordance with the control program and the security program stored in the ROM 109 (S5). In this case, since the job management table is held, the stored image data can be processed after the restart of the printer 1.

As described above in detail, in the printer 1, after a password is accepted from the PC 2 together with the image data and the job information, the image data is encrypted and stored in the storage part 106, the job information is associated with the password and stored in the management part 104 in the job management table, the process waits, and in case that the security program is executable, the operation of the backup part 105 to supply power to the management part 104 is inhibited in case that the main power 110 is turned off, thereby deleting the job information table stored in the management part 104. In case that the printer 1 is restarted, since the job management table including the information on the storage area necessary for reading out the image data is deleted, it is difficult to read out the image data stored in the storage part 106. Consequently, in case that unprocessed image data is stored in the printer 1 such as in case that the user who transmitted the image data from the PC 2 to the printer 1 forgot to output the image, the image data is prevented from continuing being stored in a condition where it can be taken out to the outside even after the power is turned off and the printer 1 is restarted, so that the confidentiality of the information to be processed can be maintained. Moreover, in case that the security program does not execute such as when the printer 1 is used for purposes not requiring that confidentiality be maintained, the job management table stored in the management part 104 is protected by the backup part so that the image output is enabled even after the restart, thereby maintaining convenience. Further, since the storage part 106 stores the image data in a condition of being encrypted, even when the security program does not execute, it is difficult to take out the image data to the outside for use, and it is facilitated to maintain the confidentiality of the information.

While in the present embodiment, a method is used in which the job management table is protected by supplying power from the backup part 105 to the management part 104, the present invention is not limited thereto; a non-limiting illustrative method may be used in which the job management table is protected by storing the job management table in another nonvolatile storing means. Moreover, a non-limiting illustrative method may be used in which the kind of the job information included in the job management table is determined and job information to be protected is selected based on the kind of the job information such as determining whether the job information is job information of normal output or job information of confidential output with reference to the contents of the job information, storing only the job information of normal output in the nonvolatile storing means and protecting it. Moreover, as a non-limiting illustrative method of deleting the job management table, a method may be used in which the job management table is forcibly deleted in case that the main power 110 is turned off or at the time of restart. Further, while in the present embodiment, a method in which the job management table is deleted is described, the present invention is not limited thereto; a non-limiting illustrative method may be used in which the image data itself is deleted in addition of the job management table by the turning off of the power. In this case, the confidentiality of the information to be processed can be more reliably maintained.

As described above in detail, in an information processing apparatus provided with: storing means for storing unprocessed information; and resuming means for resuming, in case that processing is resumed such as when the power is shut off and turned on again, the information processing under a condition where the unprocessed information is stored in the storing means, in case that invalidating means for invalidating the processed information is operable, the operation of the resuming means is limited, part or all of the unprocessed information is deleted and the information processing is resumed. By resuming the processing under a condition where part or all of the unprocessed information is deleted, the information associated with the processing is prevented from continuing being stored in a condition where it can be taken out to the outside, thereby maintaining the confidentiality of the information to be processed.

Moreover, the resuming means can maintain the unprocessed information so as not to be lost even while the power is shut off to thereby enable the performance of the processing of the information that the process waits to perform, so that convenience is maintained.

Moreover, data to be processed such as image data, and associated information including information necessary for reading out data such as an address where the data is stored are stored in the storing means, and in case that the invalidating means is operating, the processing is resumed under a condition where the associated information is deleted. The associated information is lost after the restart, so that it is difficult to read out the data. This prevents the information associated with the processing from continuing being stored in a condition where it can be taken out to the outside, thereby maintaining the confidentiality of the information to be processed.

Further, by storing the data to be processed in a condition of being encrypted, it is made difficult to take out data such as image data to the outside for use in case that the invalidating means is not operating and it is facilitated to maintain the confidentiality of the information.

The invention claimed is:

1. An information processing apparatus, comprising:
 a power switch for activating the information processing apparatus;
 a receiving unit that receives an instruction for turning off the power switch;
 a storage unit that stores data to be processed;
 a management record unit that records processing contents data representing processing contents of the data to be processed;
 a control unit that controls to carry out information processing, based on the processing contents data recorded in the management record unit, about the data to be processed stored in the storage unit;
 a resuming unit that resumes, when the information processing is temporarily stopped and resumed, the information processing based on the processing contents data which is not changed between pre- and post-resuming;

an invalidating unit that invalidates the processing contents data recorded in the management record unit;

an operation admission unit that utilizes a setting which determines whether or not the processing contents should be invalidated to make the invalidating unit operable so that after the information processing is carried out, the invalidating unit invalidates the processing contents data representing processing contents of data for which the information processing has been carried out;

a decision unit that decides in response to the reception of the instruction by the receiving unit whether the invalidating unit is allowed to invalidate or not, on the basis of the setting of the operation admission unit; and a limiting unit that limits, when the power switch is turned off and the invalidating unit is operable, the operation of the resuming unit, wherein the information processing is resumed after deleting a part or all of the processing contents data recorded in the management record unit, wherein the information processing apparatus is set to operate one of first and second operation modes, the first and second operation modes being independent of settings attached to any processing contents data, when the information processing apparatus is set to operate in the first mode, the decision unit decides that the invalidating unit is allowed to invalidate in response to the reception of the instruction by the receiving unit, when the information processing apparatus is set to operate in the second mode, the decision unit decides that the invalidating unit is not allowed to invalidate in response to the reception of the instruction by the receiving unit, when the receiving unit receives the instruction, the invalidation unit performs the invalidation or not on the basis of the decision result by the decision unit, and then the power switch is turned off, the limitation performed by the limiting unit is prevented when the power switch is turned off and the invalidating unit is not operable, and if the storage unit successively stores the data to be processed, the control unit controls to carry out successive information processing about data to be processed having already been stored in the storage unit.

2. The information processing apparatus according to claim 1, wherein the resuming unit includes a condition maintaining unit that maintains a condition where the storage unit stores the processing contents data while the information processing is stopped.

3. The information processing apparatus according to claim 2, wherein
the processing contents data comprises data to be processed and associated information associated with the data, and
the limiting unit is structured so as to resume the information processing after all of the processing contents data is deleted from the management record unit.

4. The information processing apparatus according to claim 3, wherein the management record unit is structured so as to store the data to be processed, in a condition of being encrypted.

5. The information processing apparatus according to claim 1, wherein
the processing contents data comprises data to be processed and associated information associated with the data, and
the limiting unit is structured so as to resume the information processing after all of the processing contents data is deleted from the management record unit.

6. The information processing apparatus according to claim 5, wherein the management record unit is structured so as to store the data to be processed, in a condition of being encrypted.

7. An information processing apparatus, comprising:
a power switch for activating the information processing apparatus;
a receiving unit that receives an instruction for turning off the power switch;
a storage unit that stores data to be processed;
a management record unit that records processing contents data representing processing contents of the data to be processed;
a control unit that controls to carry out information processing, based on the processing contents data recorded in the management record unit, about the data to be processed stored in the storage unit;
a resuming unit that resumes, when the information processing is temporarily stopped and resumed, the information processing based on the processing contents data which is not changed between pre- and post-resuming;
an operation admission unit that additionally utilizes a setting which determines whether or not the processing contents should be invalidated to make operable an invalidating unit that invalidates, after the information processing is carried out, the processing contents data representing processing contents of data for which the information processing has been carried out;
a decision unit that decides in response to the reception of the instruction by the receiving unit whether the invalidating unit is allowed to invalidate or not, on the basis of the setting of the operation admission unit; and
a limiting unit that limits, when the power switch is turned off and the invalidating unit is operable, the operation of the resuming unit, wherein the information processing is resumed after deleting a part or all of the processing contents data recorded in the management record unit, wherein
the information processing apparatus is set to operate one of first and second operation modes, the first and second operation modes being independent of settings attached to any processing contents data,
when the information processing apparatus is set to operate in the first mode, the decision unit decides that the invalidating unit is allowed to invalidate in response to the reception of the instruction by the receiving unit,
when the information processing apparatus is set to operate in the second mode, the decision unit decides that the invalidating unit is not allowed to invalidate in response to the reception of the instruction by the receiving unit,
when the receiving unit receives the instruction, the invalidation unit performs the invalidation or not on the basis of the decision result by the decision unit, and then the power switch is turned off,
the limitation performed by the limiting unit is prevented, when the power switch is turned off and the invalidating unit is not operable, and
if the storage unit successively stores the data to be processed, the control unit controls to carry out successive information processing about data to be processed having already been stored in the storage unit.

8. The information processing apparatus according to claim 7, wherein the resuming unit includes a condition maintaining unit that maintains a condition where the storage unit stores the processing contents data while the information processing is stopped.

9. The information processing apparatus according to claim 8, wherein
the processing contents data comprises data to be processed and associated information associated with the data, and
the limiting unit is structured so as to resume the information processing after all of the processing contents data is deleted from the management record unit.

10. The information processing apparatus according to claim 9, wherein the management record unit is structured so as to store the data to be processed, in a condition of being encrypted.

11. The information processing apparatus according to claim 7, wherein
the processing contents data comprises data to be processed and associated information associated with the data, and
the limiting unit is structured so as to resume the information processing after all of the processing contents data is deleted from the management record unit.

12. The information processing apparatus according to claim 11, wherein the management record unit is structured so as to store the data to be processed, in a condition of being encrypted.

13. An information processing apparatus, comprising:
a power switch for activating the information processing apparatus;
receiving means for receiving an instruction for turning off the power switch;
storage means for storing data to be processed;
management record means for recording processing contents data representing processing contents of the data to be processed;
controlling means for controlling to carry out information processing, based on the processing contents data recorded in the management record means, about the data to be processed stored in the storage means;
resuming means for resuming, when the information processing is temporarily stopped and resumed, the information processing based on the processing contents data which is not changed between pre- and post-resuming;
invalidating means for invalidating the processing contents data recorded in the management record means;
operation admission means for utilizing a setting which determines whether or not the processing contents should be invalidated to make the invalidating means operable so that after the information processing is carried out, the invalidating means invalidates the processing contents data representing processing contents of data for which the information processing has been carried out;
decision means for deciding in response to the reception of the instruction by the receiving means whether the invalidating means is allowed to invalidate or not, on the basis of the setting of the operation admission means; and
limiting means for limiting, when the power switch is turned off and the invalidating means is operable, the operation of the resuming means, wherein the information processing is resumed after deleting a part or all of the processing contents data recorded in the management record means, wherein
the information processing apparatus is set to operate one of first and second operation modes, the first and second operation modes being independent of settings attached to any processing contents data,
when the information processing apparatus is set to operate in the first mode, the decision means decides that the invalidating means is allowed invalidate in response to the reception of the instruction by the receiving means,
when the information processing apparatus is set to operate in the second mode, the decision means decides that the invalidating means is note allowed invalidate in response to the reception of the instruction by the receiving means,
when the receiving means receives the instruction, the invalidation means performs the invalidation or not on the basis of the decision result by the decision means, and then the power switch is turned off,
the limitation performed by the limiting means is prevented when the power switch is turned off and the invalidating unit is not operable, and
if the storage means successively stores the data to be processed, the controlling means controls to carry out successive information processing about data to be processed having already stored in the storage means.

* * * * *